United States Patent [19]

Rulseh

[11] Patent Number: 4,466,310

[45] Date of Patent: Aug. 21, 1984

[54] TIMING MECHANISM WITH TWO INDEPENDENT ROTARY OUTPUTS

[75] Inventor: Roger D. Rulseh, New Holstein, Wis.

[73] Assignee: AMF Incorporated, White Plains, N.Y.

[21] Appl. No.: 484,013

[22] Filed: Apr. 18, 1983

Related U.S. Application Data

[63] Continuation of Ser. No. 235,285, Feb. 17, 1981, , which is a continuation of Ser. No. 69,032, Aug. 29, 1979, abandoned.

[51] Int. Cl.3 .......................... F16H 37/06; H01H 3/00

[52] U.S. Cl. .................................. 74/665 GA; 74/436; 74/820; 200/38 B; 200/153 PA

[58] Field of Search ..................... 74/3.54, 84 R, 84 S, 74/415, 435, 436, 665 GA, 820; 200/35 R, 37 A, 38 B, 153 PA

[56] References Cited

U.S. PATENT DOCUMENTS

| | | | |
|---|---|---|---|
| 627,952 | 6/1899 | Chronik | 74/436 |
| 2,094,317 | 9/1937 | Evers | 40/33 |
| 2,917,939 | 12/1959 | Harris | 74/435 |
| 2,973,412 | 2/1961 | Joseph et al. | 200/153 PA |
| 3,472,976 | 10/1969 | Hunt | 200/38 B |
| 3,638,509 | 2/1972 | Hunt | 74/436 |
| 3,745,852 | 7/1973 | Robinson | 74/436 |
| 3,884,088 | 5/1975 | Bertozzi et al. | 74/435 |
| 4,103,119 | 7/1978 | Homan et al. | 200/35 R |

FOREIGN PATENT DOCUMENTS

| | | | |
|---|---|---|---|
| 617253 | 2/1949 | United Kingdom | 74/436 |
| 206258 | 1/1968 | U.S.S.R. | 74/436 |

*Primary Examiner*—Allan D. Herrmann
*Assistant Examiner*—Joseph M. Rolnicki
*Attorney, Agent, or Firm*—David E. Dougherty

[57] ABSTRACT

A timing mechanism for use in an appliance such as a domestic clothes dryer, for example. The mechanism includes a synchronous motor and two output shafts. One output shaft is the conventional rotary output shaft of the speed reducing gear train associated with the synchronous motor. The second output shaft is the rotary axle of a Geneva follower gear that is driven by a Geneva driver gear that is in turn driven by a gear located intermediate the input and first output shaft of the gear train. The intermittent rotation of the second output shaft, wherein each intermittent rotation is accomplished in a relatively rapid time, permits a timing cam thereon to control a switch actuator to provide a precise and quite brief switching action of the order of five seconds, for example.

5 Claims, 3 Drawing Figures

TIMING MECHANISM WITH TWO INDEPENDENT ROTARY OUTPUTS

This application is a continuation of copending application Ser. No. 235,285, filed on Feb. 17, 1981, which in turn is a continuation of application Ser. No. 069,032 filed Aug. 29, 1979, now abandoned.

This invention relates to a timer mechanism for use in an appliance such as a household clothes dryer, and more particularly to a timer motor and speed reducing gear train that has two separate output drive shafts. One output shaft is at the end of the speed reducing gear train and rotates continuously to provide one timing cycle of thirty minutes, for example. The other output shaft is taken from a gear that is intermediate the input and output of the speed reducing gear train and provides a second timing cycle of five minutes. The second output shaft drives a timing cam that must actuate an electromechanical switch for a very short time interval of approximately five seconds. On a circular cam of a relatively small size that is employed in a typical timer mechanism used in a household appliance, the five second timing segment is so small that the desired five second time interval cannot be achieved with the desired accuracy.

In the use of the timer mechanism of this invention, the first rotating output shaft at the end of the gear train continuously rotates a shaft that has a plurality of flat disc timing cams thereon. These cams control respective electromechanical switches that in turn control the heating element of the dryer, the motor that tumbles the drum that holds the clothes, and the timing motor itself. The second rotating output shaft is rotated by the five minute gear of the speed reducing gear train and has a timing gear secured thereto for providing a five second tumbling interval for the drum each five minute period after the conclusion of a permanent press drying cycle and until the operator turns off the dryer.

This latter feature is common in clothes dryers that have an automatic drying cycle. It is undesirable to allow permanent press clothing to remain in the dryer after the dryer shuts off. The clothes will settle in their rumpled condition and wrinkles will set in. Consequently, an anti-wrinkle feature is provided that tumbles and fluffs the clothes for a short period of five seconds, for example, each five minute period after completion of the permanent press cycle. The five second fluffing interval may or may not be accompanied by a buzzer that alerts the user to the fact that the automatic permanent press cycle is completed. This automatic permanent press cycle, with the fluffing intervals after the conclusion of the cycle, is well known and will not be further explained.

In the prior art, the cam that timed the fluffing interval was directly connected to the rotating shaft of the five minute gear of the speed reducing gear train. The cam rotated continuously, making one revolution in five minutes. It was found to be extremely difficult, particularly on mass production timing mechanisms, to accurately achieve the desired timing interval for the fluffing operation. It will be appreciated that a five second time segment on the periphery of a disc cam whose diameter is 0.5 inch, for example, and which makes one continuous rotation in five minutes is a very small segment on the periphery of that cam.

The present invention resides in the timing mechanism that provides a second output shaft whose rotation is intermittent in angular segments that are considerably less than a full rotation. The intermittent angular rotations are great enough in angular extent and short enough in time duration to make it possible to easily obtain an accurate five second switch operation from a timing segment on the intermittently rotating cam.

DESCRIPTION OF PREFERRED EMBODIMENT

The invention will be described by referring to the accompanying drawings wherein.

Figure 1:
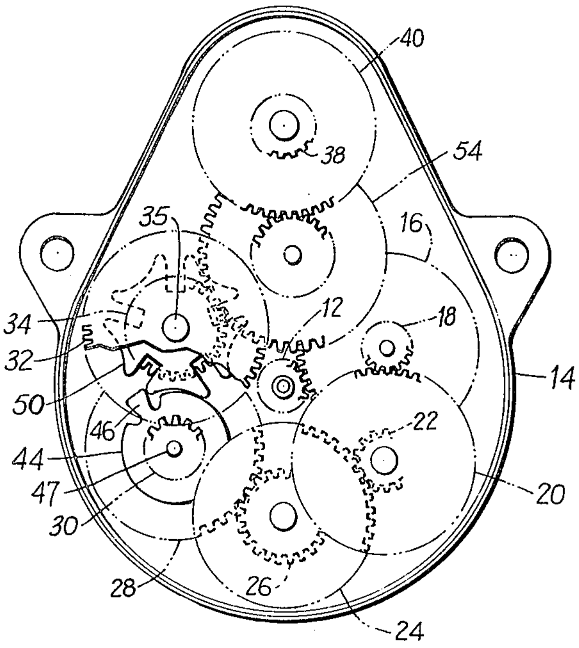
FIG. 1 is a plan view illustrating the speed reducing gear train that is coupled to a synchronous motor of a timing mechanism.
Figure 3:
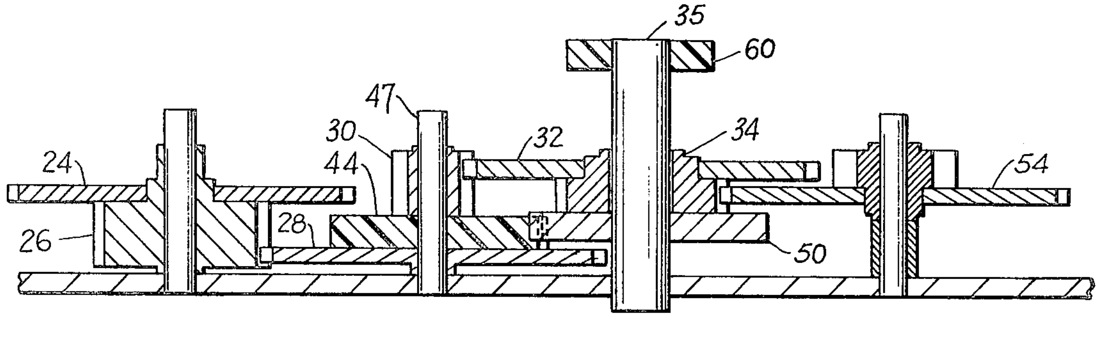
FIG. 3 is a schematic illustration of a portion of the speed reducing gear train of this invention.

Referring in detail to the drawings, the gear train is comprised of a motor pinion gear 12 that is attached to the output shaft of an electrical synchronous motor. The motor, not illustrated, is secured to the back side of the case 14, as is common in the art. The gear train includes a number of gears having pinions fixedly attached thereto, as is illustrated in FIGS. 1 and 3 by gear 16 and pinion 18 that are driven by motor pinion 12, gear 20 and pinion 22, gear 24 and pinion 26, and gear 28 and pinion 30. Gear 32 and its pinion 34 are driven from pinion 30, and so forth. Ultimately, the final, low speed output of the speed reducing gear train is taken from output pinion 38 on gear 40.

Figure 2:
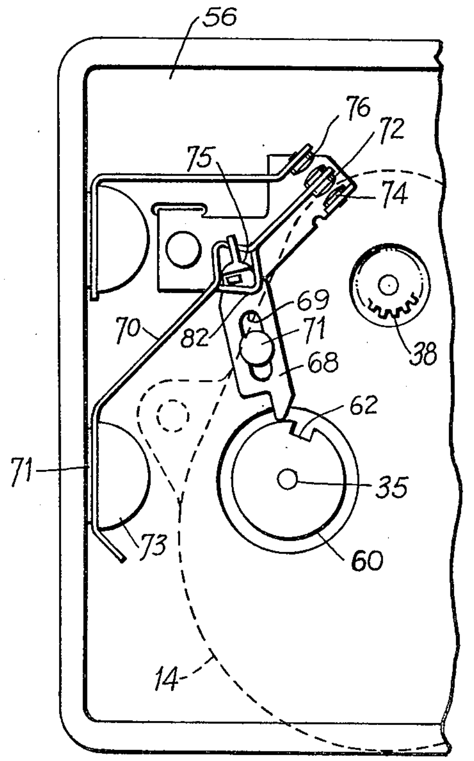
FIG. 2 is a partial view of the case of a switch mechanism which receives the first output shaft at the output end of the speed reducing gear train and the second output shaft having the intermittently rotating timing cam thereon.

All of the gears and pinions are supported by respective axial pins or shafts. Where required, a spacer sleeve on an axial pin establishes the proper height of a gear and pinion to assure that they will mesh with adjacent gears and pinions. As discussed below, and as may be seen in FIG. 3, gear 32 and pinion 34 rotate together freely on axial pin 35 so that they transmit motion from pinion 30 on one-minute gear 28 to 15-minute gear 54 completely independently of the rotation of axial pin 35. As seen in FIGS. 2 and 3, a timing cam 60 is secured to the top of pin 35. Pin 35 comprises the second output of the gear train.

As is well understood, the magnitude of the speed reduction provided by the gear train will be chosen in accordance with the requirement of the apparatus to be connected to output pinion 38. For purpose of this description, it will be assumed that gear 40 and output pinion 38 make one revolution in 30 minutes, and gear 32 and its associated pinion 34 make one revolution in five minutes. Gear 28 and its respective pinion 30 make one revolution per minute. Output pinion 38 comprises the first rotary output and pin 35 comprises the second rotary output of the timer mechanism of this invention.

As best seen in FIG. 1, a Geneva drive gear 44 having a single tooth 46 is fixedly attached to one-minute gear 28 and pinion 30, and all are rotatable together on axial shaft 47. A Geneva star wheel, or follower, 50 is fixedly attached to axial pin 35 and is intermittently rotated by the single tooth 46 of Geneva driver gear 44. As mentioned previously, five-minute gear 32 and pinion 34 rotate together freely on axial pin 35. Consequently, Geneva follower 50 and five-minute gear 32 provide parallel and independent outputs from the rotary motion transmitted from one-minute gear 28 by way of Geneva driver 44 and pinion 30, respectively.

FIG. 2 is a partial view of a molded plastic case 56 that contains the switching mechanism which controls the operation of the clothes dryer. Output pinion 38 and timing cam 60 on pin 35 of the timing mechanism extend through respective openings on a flat side of case 56. Cam 60 has a drop-off segment 62 for controlling the position of a slidable cam follower 68 and a switch arm 70. Cam follower 68 has an elongated slot 69 extending through it. A post 71 molded on the inside surface of case 56 is received in slot 69 to guide cam follower 68 in its reciprocating motion. Flexible switch arm 70 is secured at one end in a notch 71 molded into case 56 between the outside wall thereof and an upstanding half round post 73. The switch arm is attached to cam follower 68 by means of a resilient plastic clip 75 on the end of cam follower 68. Switch arm 70 is spring biased to urge cam follower 68 into contact with the peripheral surface of cam 60.

A movable switch contact 72 is fixed at the end of flexible switch arm 70. When cam follower 68 is on the high part of cam 60, movable contact 72 is out of contact with both stationary switch contacts 74 and 76. When cam follower 68 falls into the timing segment 62 of cam 60, switch arm 70 brings movable contact 72 into engagement with stationary contact 74. When closed, contacts 72 and 74 complete a circuit that supplies electrical power to the motor that rotates the clothes drum in the dryer.

As seen in FIG. 2, a cam follower 82 on switch arm 70 rides on the periphery of another larger cam that is on a shaft which continuously rotates in response to the continuous rotation of output pinion 38. The cooperative operation of the other larger cam and timing cam 60 allows contacts 72 and 74 to close only after the conclusion of the permanent press cycle. This type of arrangement exists in the known prior art and will not be further explained. Because the electrical circuitry of the dryer is known and is not the subject of this invention, it is not illustrated and will not be described.

Although the timing mechanism has the same second rotary output pin 35 and timing cam 60 as the prior art had, an improved timing accuracy can be obtained from a five second timing segment 62 on the timing cam 60. This is achieved as a result of the provision of Geneva driver 44 and Geneva follower 50, and their disengagement from the remainder of the speed reducing gear train. That is, gear 32 and pinion 34 rotate freely relative to Geneva follower 50 and its axial pin 35.

In considering the functioning of the Geneva mechanism and output pin 35, it is seen that Geneva driver 44 has one tooth and rotates once each minute with one-minute gear 28. Because Geneva follower 50 has five (n) radial slots equally spaced about its periphery, it will rotate 72 degrees (360°/n) each time tooth 46 engages with and rotates through a radial slot on Geneva follower 50. The parameters of the Geneva mechanism are so chosen that each intermittent 72 degree rotation of follower 50 occurs in 15 seconds. This means that timing cam 60 makes five 72 degree intermittent rotary movements in a five minute time period, and each one of the five rotary movements takes 15 seconds to complete. It is seen that a five second timing segment on cam 60 will be one-third of the 72° rotation, or a 24 degree segment on the periphery of cam 60. This may be compared with the prior art wherein a 5 second segment on a continuously rotating five minute cam resulted in only a 6 degree time segment on the periphery of the cam.

While a preferred embodiment of the invention has been illustrated and described, it is to be understood that alterations and modifications may be made to the described embodiment without departing from the scope of the present invention.

What is claimed is:

1. A timing means having a first cycle output continuously rotating at a predetermined number of revolutions per unit time and a second timing cycle output intermittently rotating at a greater number of revolutions per unit time than said first output and providing a timing segment for a portion of each revolution of said second output a predetermined number of times during each revolution of said first timing cycle output comprising:

- a single input shaft arranged to be continuously rotated;
- a plurality of gears each having a pinion attached thereto;
- said gears and pinions driven by said single input shaft and being interconnected in series to thereby form a speed reducing gear train having a single input shaft at one end adapted to be continuously rotated and providing said first timing cycle output rotating at a lower speed than said input;
- each of said gears of said gear train rotating at a greater speed than the next successive gear;
- a Geneva driver gear connected to and continuously rotated with one of said gears and its respective pinion intermediate the ends of said gear train, said Geneva driver gear and its associated gear and pinion all driven by a single input pinion;
- an axial pin carrying the gear and pinion next successive to said one of said gears in freely rotatable relationship on said axial pin;
- a Geneva follower gear affixed to said axial pin and operatively coupled to said Geneva driver gear for intermittent rotary motion comprising a plurality of incremental angular movements separated from one another by stop periods;
- timing cam means connected to and rotatable with said Geneva follower gear providing a second timing cycle having a faster period than the first timing cycle and having a timing segment thereon; and
- said timing segment providing a timing period during each second timing cycle that is shorter in duration than the time duration of an incremental angular movement of the Geneva follower gear.

2. The timing means in accordance with claim 1, further comprising

- switch means operatively coupled to said cam means for changing switching states in response to operation by said timing segment.

3. The timing means in accordance with claim 1, further comprising

- a synchronous timing motor driving said input shaft;
- a gear casing secured to said synchronous motor and receiving said motor output pinion therein; and
- said gear train with said Geneva drive and follower gears positioned within said casing.

4. The timing means in accordance with claim 3, wherein said timing cam means is disposed outwardly of said gear casing, and further comprising

- switch means operatively coupled to said cam means for changing switching states in response to operation by said timing segment.

5. The timing means in accordance with claim 4 wherein said Geneva follower gear is in the form of a star wheel having a plurality of n slots therein for receiving Geneva driver means therein; and said Geneva driver means includes a single tooth driver for successively engaging the n slots on the Geneva follower gear on n successive rotations of the Geneva driver means, thereby imparting an incremental rotation to the Geneva follower gear in response to each rotation of the Geneva driver gear, whereby each incremental motion of the follower gear occurs during a time period that is less than the period of rotation of the driver gear by a factor less than 1/n.

* * * * *